US012759908B2

(12) United States Patent
Hanaoka

(10) Patent No.: US 12,759,908 B2
(45) Date of Patent: Oct. 13, 2026

(54) ELECTROLYZED WATER PRODUCTION APPARATUS, AND ELECTROLYZED WATER PRODUCTION METHOD USING SAME

(71) Applicants: BIO-REDOX LABORATORY INC., Nagano (JP); Yoshihiro Otogawa, Osaka (JP)

(72) Inventor: Kokichi Hanaoka, Nagano (JP)

(73) Assignees: BIO-REDOX LABORATORY INC., Nagano (JP); Yoshihiro Otogawa, Osaka (JP)

( * ) Notice: Subject to any disclaimer, the term of this patent is extended or adjusted under 35 U.S.C. 154(b) by 498 days.

(21) Appl. No.: 18/282,307

(22) PCT Filed: Mar. 16, 2021

(86) PCT No.: PCT/JP2021/010573

§ 371 (c)(1),
(2) Date: Sep. 15, 2023

(87) PCT Pub. No.: WO2022/195708

PCT Pub. Date: Sep. 22, 2022

(65) Prior Publication Data

US 2024/0174533 A1 May 30, 2024

(51) Int. Cl.
*C02F 1/461* (2023.01)
*C02F 1/28* (2023.01)
(Continued)

(52) U.S. Cl.
CPC ............ *C02F 1/4618* (2013.01); *C02F 1/283* (2013.01); *C02F 1/46109* (2013.01); *C25B 1/04* (2013.01);
(Continued)

(58) Field of Classification Search
CPC ...................................................... C02F 1/4618
See application file for complete search history.

(56) References Cited

U.S. PATENT DOCUMENTS 8,308,917 B2 * 11/2012 Hinatsu ..................... C25B 1/02 205/628
10,071,920 B2 * 9/2018 Hanaoka ............... C02F 1/4618
(Continued)

FOREIGN PATENT DOCUMENTS

JP 61-028493 A 2/1986
JP 2002-038290 A 2/2002
(Continued)

OTHER PUBLICATIONS

International Search Report dated Apr. 7, 2021, in connection with PCT International Application No. PCT/JP2021/010573.
(Continued)

*Primary Examiner* — Brian W Cohen
(74) *Attorney, Agent, or Firm* — Norris McLaughlin, PA

(57) ABSTRACT

An electrolyzed water production apparatus and methods are provided and comprise an electrolysis raw water supplying means, an electrolysis tank connected to the electrolysis raw water supplying means, and an activated carbon filter connected to the outlet side of the electrolysis tank. The electrolysis tank is equipped with a pair of bipolar plates arranged in parallel with each other. A membrane-electrode assembly is provided between the bipolar plates in parallel with the bipolar plates. An outlet side of a first electrolysis chamber and an inlet side of a second electrolysis chamber are connected to each other in an outside of the electrolysis tank in a liquid-tight manner and a liquid-permeable power feeder is arranged approximately uniformly in each of the
(Continued)

first electrolysis chamber and the second electrolysis chamber and comprises a metallic mesh having a three-dimensional structure.

5 Claims, 1 Drawing Sheet

(51) Int. Cl.

| | |
|---|---|
| ***C02F 103/02*** | (2006.01) |
| ***C25B 1/04*** | (2021.01) |
| ***C25B 9/15*** | (2021.01) |
| ***C25B 9/23*** | (2021.01) |
| ***C25B 9/70*** | (2021.01) |
| ***C25B 11/036*** | (2021.01) |
| ***C25B 11/042*** | (2021.01) |
| ***C25B 13/08*** | (2006.01) |
| ***C25B 15/08*** | (2006.01) |

(52) U.S. Cl.
CPC .................. *C25B 9/15* (2021.01); *C25B 9/23* (2021.01); *C25B 9/70* (2021.01); *C25B 11/036* (2021.01); *C25B 11/042* (2021.01); *C25B 13/08* (2013.01); *C25B 15/08* (2013.01); *C02F 2001/46128* (2013.01); *C02F 2001/46142* (2013.01); *C02F 2001/4619* (2013.01); *C02F 2103/02* (2013.01); *C02F 2201/46115* (2013.01)

(56) References Cited

U.S. PATENT DOCUMENTS

| | | | | | |
|---|---|---|---|---|---|
| 2004/0253519 | A1* | 12/2004 | Oldani | .................. | H01G 11/70 429/238 |
| 2017/0217799 | A1 | 8/2017 | Hanaoka | | |

FOREIGN PATENT DOCUMENTS

| | | | |
|---|---|---|---|
| JP | 2005-307232 | A | 11/2005 |
| JP | 2014-124601 | A | 7/2014 |
| JP | 2018-076579 | A | 5/2015 |
| JP | 2015-174085 | A | 10/2015 |
| JP | 2015-217357 | A | 12/2015 |
| JP | 2015-221397 | A | 12/2015 |
| JP | 2016-108309 | A | 6/2016 |
| JP | 2017-196559 | A | 11/2017 |
| JP | 2021-112730 | A | 8/2021 |

OTHER PUBLICATIONS

English translation of International Search Report dated Apr. 7, 2021, in connection with PCT International Application No. PCT/JP2021/010573.

Written Opinion in connection with PCT International Application No. PCT/JP2021/010573.

* cited by examiner

[Fig. 1]
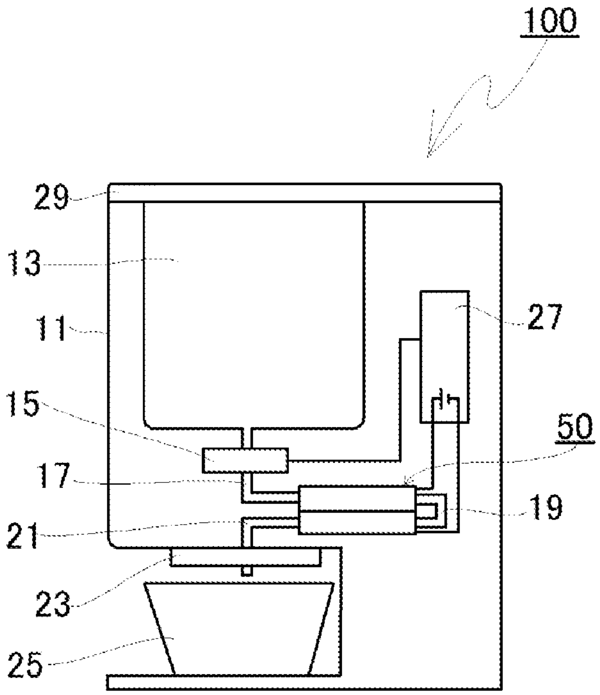
[Fig. 2]
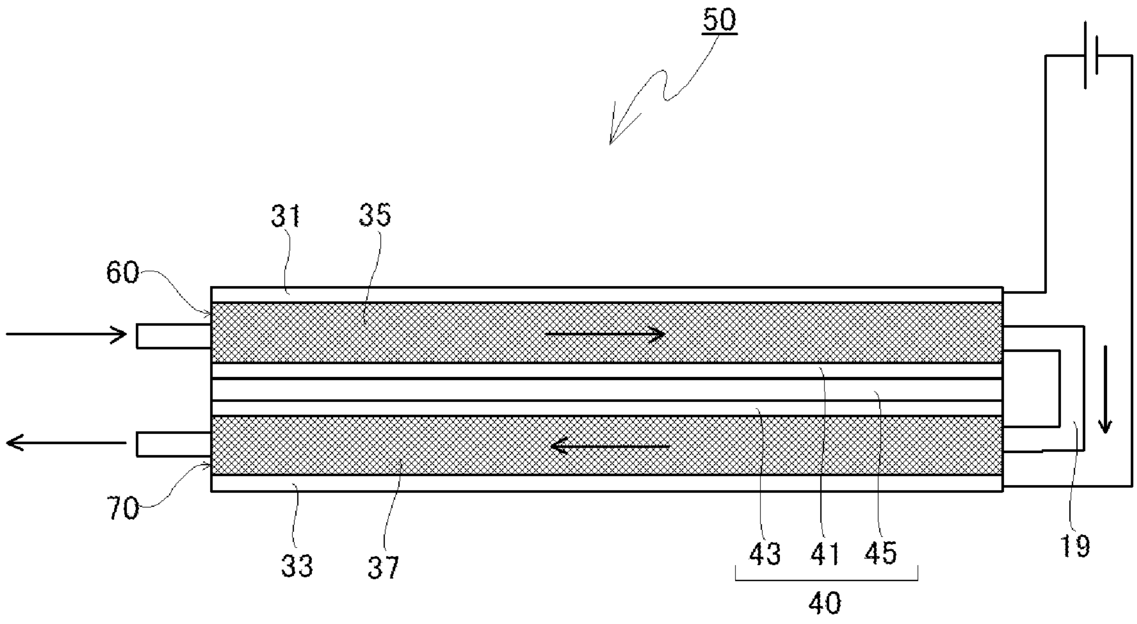

ELECTROLYZED WATER PRODUCTION APPARATUS, AND ELECTROLYZED WATER PRODUCTION METHOD USING SAME

This application is the U.S. 371 National Stage of International Application No. PCT/JP2021/010573, filed Mar. 16, 2021, the disclosure of which is incorporated herein by reference.

TECHNICAL FIELD

The present invention relates to an electrolyzed water production apparatus that performs electrolysis of water using a solid polymer electrolyte membrane as an electrolyte, and a method for producing electrolyzed water using the electrolyzed water production apparatus. Specifically, the present invention relates to the electrolyzed water production apparatus for electrolyzing the water using the solid polymer electrolyte membrane as the electrolyte while supplying electrolysis raw water (water before electrolysis) to the solid polymer electrolyte membrane to dissolve generated oxygen gas and hydrogen gas in the electrolyzed water, and the method for producing the electrolyzed water using the electrolyzed water production apparatus.

BACKGROUND ART

In general, a membrane type electrolysis tank having a membrane between a pair of electrodes is used in an electrolyzed water production apparatus. For the membrane of the membrane type electrolysis tank, an ion exchange membrane which is a charged membrane, a neutral membrane which is an uncharged membrane, and the like are used. Acidic electrolyzed water is generated on an anode side (anode chamber) of the membrane type electrolysis tank, and alkaline electrolyzed water is generated on a cathode side (cathode chamber) of the membrane type electrolysis tank. When an apparatus using the membrane type electrolysis tank is used, anode side electrolyzed water (anode water) and cathode side electrolyzed water (cathode water) are separately collected in a usual case.

When electrolysis is performed by adding a chloride such as sodium chloride as an electrolyte to the electrolysis raw water, hydrochloric acid, hypochlorous acid, dissolved oxygen, and active oxygen such as hydroxyl radical, which are electrode reaction products, are generated on the anode side. Since the hypochlorous acid causes a strong chlorination reaction and oxidation reaction, the anode water is used for sterilization of fungi and the like.

On the other hand, the cathode water generated on the cathode side is widely known as drinking alkali ion water. Cathode water production apparatuses are commercially available as medical devices and the like, and are widely used along with the spread of mineral water.

These electrolyzed water can express its properties by several parameters. As the parameters, pH, oxidation-reduction potential, dissolved oxygen concentration, dissolved hydrogen concentration, hypochlorous acid concentration, and the like are adopted. Values of these parameters are determined by a type and concentration of a solute contained in the electrolysis raw water, the magnitude of an electrolysis energy applied to the electrolyzed water, and the like.

When the electrolyzed water is used for drinking, the most important parameters are the hypochlorous acid concentration and pH value. Since the hypochlorous acid is not contained in the cathode water, only the pH value matters. Since strongly alkaline or strongly acidic electrolyzed water is dangerous for a living body, the electrolyzed water in a neutral to weakly alkaline (pH 9.5 or less) range can be drunk. Since the anode water is shifted to the strongly acidic side and the cathode water is shifted to the strongly alkaline side when the electrolysis energy is large, an excessively large amount of electric quantity cannot be used usually during electrolyzation.

Various methods have been conventionally used to keep the pH value of the electrolyzed water obtained by using a high amount of the electric quantity during the electrolyzation within a predetermined range. For example, Patent Literature 1 discloses an apparatus for producing the electrolyzed water in which the electrolysis is performed in the anode chamber and then electrolysis is performed again in the cathode chamber. Patent Literature 2 discloses a method for producing the electrolyzed water using a membrane-electrode assembly in which the membrane and the electrodes are integrated.

CITATION LIST

Patent Literature

Patent Literature 1: JP 2014-124601 A
Patent Literature 2: JP 2015-221397 A

SUMMARY OF INVENTION

Technical Problem

An object of the present invention is to provide an electrolyzed water production apparatus capable of electrolyzing purified water having low electric conductivity such as reverse osmosis membrane treat water or ion-exchange resin treat water as electrolysis raw water, capable of producing electrolyzed water in a neutral range suitable for drinking, and capable of allowing oxygen gas and hydrogen gas generated by electrolysis to coexist and dissolve in the electrolyzed water at a high concentration, and a method for producing the electrolyzed water using the electrolyzed water production apparatus.

Solution to Problem

As a result of intensive studies to solve the above problems, the present inventor has found that when electrolysis raw water is electrolyzed using a solid polymer electrolyte membrane, a bipolar plate that supplies a current to the solid polymer electrolyte membrane and the solid polymer electrolyte membrane are electrically connected by a power feeder having a gas diffusion ability, and the electrolysis raw water is sequentially circulated between an anode side and a cathode side of an electrolysis tank to be electrolyzed, then electrolyzed water in a neutral range suitable for drinking can be obtained even with the raw water having a low electric conductivity without adding an electrolyte, and it is possible to allow oxygen gas and hydrogen gas to coexist and dissolve in the electrolyzed water at a high concentration, thereby completing the present invention.

The present invention for solving the above problems will be described below.

[1] An electrolyzed water production apparatus including: an electrolysis raw water supplying means; an electrolysis tank connected to the electrolysis raw water supplying means; and an activated carbon filter connected to an outlet of the electrolysis tank, wherein the electrolysis tank is formed in a hollow box-like shape, the electrolysis tank includes a pair of bipolar plates arranged parallel to each other in contact with inner walls of the electrolysis tank facing each other, a membrane-electrode assembly is disposed between the bipolar plates parallel to the bipolar plates, the membrane-electrode assembly includes a solid polymer electrolyte membrane and liquid-permeable electrode catalysts formed in contact with both surfaces of the solid polymer electrolyte membrane, the membrane-electrode assembly partitions an inside of the electrolysis tank to form a first electrolysis chamber and a second electrolysis chamber between the bipolar plates and the membrane-electrode assembly, respectively, an outlet of the first electrolysis chamber and an inlet of the second electrolysis chamber are connected to each other in an outside of the electrolysis tank in a liquid-tight manner, a liquid-permeable power feeder is arranged almost uniformly in each of the first electrolysis chamber and the second electrolysis chamber, the power feeder electrically connects each of the bipolar plates to each of the electrode catalysts in the membrane-electrode assembly, the power feeder includes a metallic mesh having a three-dimensional structure and having a wire diameter of 10 to 300 (μm), a thickness of each of the electrode catalysts is 1 to 100 (μm), and a distance between each of the bipolar plates and each of the electrode catalysts is 1.0 to 3.0 (mm).

The electrolyzed water production apparatus of [1] is an electrolyzed water production apparatus illustrated in FIG. 1 described later, and includes an electrolysis tank illustrated in FIG. 2 described later. This electrolyzed water production apparatus supplies water to the solid polymer electrolyte membrane by sequentially supplying the electrolysis raw water into a first electrolysis chamber (for example, an anode chamber) and a second electrolysis chamber (for example, a cathode chamber), performs electrolysis of the water using the solid polymer electrolyte membrane as an electrolyte, and supplies gases generated by the electrolysis into the first electrolysis chamber (oxygen gas) and the second electrolysis chamber (hydrogen gas), respectively. Since a power feeder having gas diffusion capability is disposed in each of the first electrolysis chamber and the second electrolysis chamber, the supplied gas is dispersed in the electrolyzed water as fine bubbles and quickly dissolved. Since the power feeder is fibrous or mesh-like having a three-dimensional structure, its gas diffusion ability is extremely high, and bubbles of fine gas are retained and held in the fiber or the three-dimensional structure metal mesh, thus the gas can be dissolved in the electrolyzed water at a high concentration. The first electrolysis chamber may be configured as a cathode chamber, and the second electrolysis chamber may be configured as an anode chamber, or these polarities may be configured to be changeable.

[2] The electrolyzed water production apparatus according to [1], wherein a material of the electrode catalysts is platinum or iridium alloy.

Since the electrolyzed water production apparatus of [2] has the electrode catalyst with high chemical stability, a strongly acidic solid polymer electrolyte membrane can be used.

[3] A method for producing electrolyzed water using the electrolyzed water production apparatus according to [1] including the steps of: feeding an electrolysis raw water to a first electrolysis chamber and a second electrolysis chamber of an electrolysis tank in sequence; electrolyzing water in a membrane-electrode assembly by supplying a current from a bipolar plate disposed in the electrolysis tank to the membrane-electrode assembly through a power feeder; obtaining the electrolyzed water by sequentially dissolving oxygen gas and hydrogen gas generated during electrolyzation in water flowing in the first electrolysis chamber and the second electrolysis chamber, respectively; and conducting the electrolyzed water discharged from the second electrolysis chamber through an activated carbon filter.

The method for producing the electrolyzed water in the above [3] includes sequentially circulating the electrolysis raw water to the first electrolysis chamber and the second electrolysis chamber of the electrolysis tank, and dispersing both the oxygen gas and the hydrogen gas generated by the electrolysis using the solid polymer electrolyte membrane as fine bubbles in the electrolysis raw water to be dissolved. Therefore, large bubbles are not generated in the apparatus, and the generated oxygen gas and hydrogen gas are dissolved in the electrolyzed water at a high concentration.

[4] The method for producing the electrolyzed water according to [3], wherein an electric conductivity of the electrolysis raw water is 0.5 to 100 (mS/m).

The method for producing the electrolyzed water of the above [4] can use not only tap water but also the water from which an electrolyte such as reverse osmosis membrane treat water or ion-exchange resin treat water has been removed as the electrolysis raw water.

[5] The method for producing the electrolyzed water according to [3], wherein an electrolysis electric quantity per 100 (mL) of the electrolysis raw water is 60 to 180 coulombs.

In the method for producing the electrolyzed water of the above [5], since the amount of the electrolysis electric quantity is large, the electrolyzed water that is highly electrolyzed can be obtained.

Advantageous Effects of Invention

The electrolyzed water production apparatus of the present invention circulates the water electrolyzed in the first electrolysis chamber (anode chamber) to the second electrolysis chamber, and further electrolyzes the water to obtain the electrolyzed water. Therefore, the pH value of the obtained electrolyzed water does not substantially vary from the pH value of the electrolysis raw water. That is, when the tap water is used as the electrolysis raw water, substantially neutral electrolyzed water suitable for drinking is obtained. In addition, unlike a conventional electrolyzed water production apparatus that obtains anode electrolyzed water and cathode electrolyzed water by performing the electrolysis on the anode chamber side and the cathode chamber side, respectively, it is not necessary to discard the water obtained in one of the electrolysis chambers. In addition, since the water electrolyzed in the first electrolysis chamber (anode chamber) flows through the second electrolysis chamber and is further electrolyzed, the applied electric energy increases, and the properties of the obtained electrolyzed water can be greatly changed.

Since the electrolyzed water production apparatus of the present invention performs the electrolysis using the solid polymer electrolyte membrane as the electrolyte, the electrolysis can be efficiently performed without adding the electrolyte to the electrolysis raw water. In addition, since the electrolysis is performed using the membrane-electrode assembly, the apparatus can be downsized.

In the electrolyzed water production apparatus of the present invention, the oxygen gas and the hydrogen gas generated by the electrolysis finely diffuse into the electrolyzed water helped by the power feeders having gas diffusion capability disposed in the electrolysis chambers. Therefore, a large amount of oxygen gas and hydrogen gas can be dissolved in the electrolyzed water.

BRIEF DESCRIPTION OF DRAWINGS

FIG. 1 is a schematic configuration diagram illustrating an example of an electrolyzed water production apparatus of the present invention.

FIG. 2 is a schematic configuration diagram illustrating an example of an electrolysis tank used in the electrolyzed water production apparatus of the present invention.

DESCRIPTION OF EMBODIMENTS (1) Configuration of Apparatus

First, a configuration of an electrolyzed water production apparatus (hereinafter, also referred to as "the present apparatus") of the present invention will be described. FIG. 1 is a schematic configuration diagram illustrating an example of the configuration of the present apparatus. FIG. 2 is a schematic configuration diagram illustrating an example of an electrolysis tank 50 used in the present device.

In FIG. 1, reference numeral 100 denotes an electrolyzed water production apparatus. An electrolysis raw water storage vessel 13 is disposed in a housing 11, One end of a pipe 17 having a pump 15 interposed therebetween is connected to a bottom of the electrolysis raw water storage vessel 13, and the other end of the pipe 17 is connected to an inlet of the electrolysis tank 50. One end of a pipe 21 is connected to an outlet of the electrolysis tank 50, and the other end of the pipe 17 is connected to an inlet of an activated carbon filter 23. An outlet of the activated carbon filter 23 is provided with an output port of the electrolyzed water. Reference numeral 25 denotes an electrolyzed water receiving vessel, and reference numeral 29 denotes a lid that covers an upper portion of the electrolysis raw water storage vessel 13. The pump 15 and the electrolysis tank 50 are controlled by a control unit 27.

In FIG. 2, reference numeral 50 denotes the electrolysis tank. The electrolysis tank 50 is formed in a hollow box-like shape, and a pair of bipolar plates 31 and 33 are arranged parallel to each other in contact with inner walls of the electrolysis tank 50 facing each other. Since the bipolar plates 31 and 33 are formed in contact with the inner wall of the electrolysis tank 50, the water does not flow outside the bipolar plates 31 and 33 (on the wall side of the electrolysis tank 50) of the electrolysis tank 50. That is, since all the water flowing in the electrolysis tank 50 passes through a layer of a power feeder (described later), an amount of dissolved hydrogen and the amount of dissolved oxygen can be increased. The bipolar plates 31 and 33 are connected to a power supply via the control unit (not illustrated). An inside of the electrolysis tank 50 is partitioned by a membrane-electrode assembly (hereinafter, sometimes referred to as MEA.) 40, a first electrolysis chamber (anode chamber) 60 is formed between the bipolar plate 31 and the membrane-electrode assembly 40, and a second electrolysis chamber (cathode chamber) 70 is formed between the bipolar plate 33 and the membrane-electrode assembly 40. In the MEA 40, an electrode catalyst 41 is formed in contact with one surface of the solid polymer electrolyte membrane 45, and an electrode catalyst 43 is formed in contact with the opposite surface. The bipolar plate 31 formed in the first electrolysis chamber 60 and the electrode catalyst 41 are electrically connected to each other by a power feeder 35 disposed in the first electrolysis chamber 60. The bipolar plate 33 formed in the second electrolysis chamber 70 and the electrode catalyst 43 are electrically connected to each other by a power feeder 37 disposed in the second electrolysis chamber 70. An outlet of the first electrolysis chamber 60 and an inlet of second electrolysis chamber 70 are liquid-tightly connected by a circulation pipe 19 in an outside of the electrolysis tank 50.

The housing 11, the electrolysis raw water storage vessel 13, the pipes 17 and 21, the circulation pipe 19, the electrolyzed water receiving vessel 25, and the lid 29 can be each made of a known material such as stainless steel, aluminum, resin, or the like coated with a resin on a pipe inner surface. A known configuration may be also adopted for the pump 15.

The bipolar plates 31 and 33 constituting the electrolysis tank 50 can be made of a known electrode material such as copper, silver, platinum, a platinum alloy, or titanium.

The solid polymer electrolyte membrane 45 constituting the MEA 40 uses a cation exchange resin membrane or an anion exchange resin membrane. Preferably, a fluororesin-based cation exchange resin film having a sulfonate group is used. A thickness of the solid polymer electrolyte membrane 45 is 10 to 1000 (μm), preferably 50 to 500 (μm), and more preferably 100 to 300 (μm). A commercially available product can be used as such a polymer film.

A thin film of platinum or iridium is used as the electrode catalysts 41 and 43. The thickness of the electrode catalyst is 1 to 100 (Vim), preferably 5 to 50 (Vim), and more preferably 10 to 30 (Vim).

The electrode catalysts 41 and 43 can be formed in contact with the surface of the solid polymer electrolyte membrane 45 by performing plating, sputtering, or the like on the surface of the solid polymer electrolyte membrane 45. The solid polymer electrolyte membrane 45 is not completely covered with the electrode catalysts 41 and 43, and has fine pores formed to such an extent as to enable permeation of at least oxygen gas and hydrogen gas.

The power feeders 35 and 37 disposed in the first electrolysis chamber 60 and the second electrolysis chamber 70 preferably have a metal mesh having a porous structure or a three-dimensional structure having liquid permeability so that the electrolysis raw water (electrolyzed water) can flow in the first electrolysis chamber 60 and the second electrolysis chamber 70 and the oxygen gas and the hydrogen gas generated in the MEA 40 can be efficiently diffused. The electrolysis raw water flows so as to penetrate the layer of the metal mesh having the three-dimensional structure. Such structure can suppress the movement of bubbles by adsorbing and holding the oxygen gas and the hydrogen gas generated by the electrolysis, and can restrict a coalescence of fine bubbles. That is, it is possible to suppress diffusion of the oxygen gas or the hydrogen gas generated by the electrolysis out of the electrolyzed water without being completely dissolved in the electrolyzed water. Therefore, the gas generated by the electrolysis can be attached to and held by the power feeder (metal mesh), and the gas can be dissolved in the electrolysis raw water.

Specifically, the metal mesh or a metal fiber is preferable. The wire diameter (fiber diameter) of the metal mesh or the metal fiber is preferably 0.1 to 1000 (μm), and more preferably 10 to 300 (μm).

Platinum, platinum alloy, titanium, and stainless steel are preferable as the material of the metal.

Preferably, the power feeders 35 and 37 are arranged almost uniformly in the first electrolysis chamber 60 and the second electrolysis chamber 70. Since the power feeders 35 and 37 are arranged almost uniformly in the first electrolysis chamber 60 and the second electrolysis chamber 70, it is possible to prevent electric power from being intensively fed to one point of the electrode catalyst and to reduce the contact resistance between the power feeder and the electrode catalyst when the electric power is fed from the bipolar plates to the electrode catalysts, thereby improving the life of the MEA. Here, "almost uniform" means that an abundance of the power feeder does not differ by 10 mass % or more when the first electrolysis chamber and the second electrolysis chamber are equally divided into 10 in a direction orthogonal to a liquid flowing direction inside the chambers, and the abundance of the power feeder does not differ by 10 mass % or more when the first electrolysis chamber and the second electrolysis chamber are equally divided into 10 in the direction parallel to the liquid flowing direction inside the chambers (thickness direction).

An interval between each of the bipolar plates 31 and 33 and each of the electrode catalysts 41 and 43 is preferably 1.0 to 3.0 (mm), and preferably 1.0 to 2.0 (mm) in particular.

A known filter using activated carbon or the like as an adsorbent can be used as the activated carbon filter 23.

As is apparent from FIG. 2 of the present application, the electrolyzed water production apparatus of the present invention having the above configuration can continuously produce the electrolyzed water in which both the oxygen and the hydrogen are dissolved by the sequentially and continuously supplying the electrolysis raw water to the first electrolysis chamber and the second electrolysis chamber to perform the electrolysis continuously.

(2) Operation of the Present Device

Next, a method for producing the electrolyzed water using the electrolyzed water production apparatus 100 illustrated in FIG. 1 will be described. Arrows in FIG. 2 indicate a flow direction of the water in the apparatus.

The electrolysis raw water storage vessel 13 is disposed in the housing 11 of the electrolyzed water production apparatus 100. Here, the lid 29 is removed, then the electrolysis raw water (water before being electrolyzed) is supplied. The electrolysis raw water stored in the electrolysis raw water storage vessel 13 is delivered to the first electrolysis chamber 60 on the anode side of the electrolysis tank 50 through the pipe 17 by driving of the pump 15 controlled by the control unit 27. The electrolysis raw water delivered to the first electrolysis chamber 60 supplies a part of water to the solid polymer electrolyte membrane 45 of the MEA 40. The electrolysis raw water is electrolyzed in the MEA 40. Specifically, a current supplied to the bipolar plate 31 by the control unit 27 is supplied to the MEA 40 thorough the power feeder 35. The water is electrolyzed in the MEA 40.

During the electrolyzation, the following electrolysis is performed on the anode side of the MEA 40.

$$2H_2O \rightarrow O_2 + 4H^+ + 4e^- \qquad \text{Formula (1)}$$

In addition, when the chloride electrolyte is dissolved, hypochlorous acid is generated at the anode as follows.

[Chemical 1]

$$Cl_2 + H_2O \rightleftarrows HCl + HOCl \rightleftarrows HCl + OCl^- \qquad \text{Formula (2)}$$

During the electrolyzation, the following electrolysis is performed on the cathode side of the MEA 40.

$$2H_2O + 2e^- \rightarrow H_2 + 2OH^- \qquad \text{Formula (3)}$$

The oxygen gas generated by the electrolysis penetrates the electrode catalyst 41 and is supplied into the first electrolysis chamber 60. At this time, although the oxygen gas is fine bubbles, the oxygen gas is maintained in a state of fine bubbles due to the presence of the power feeder 35. The oxygen gas is dispersed and dissolved in the electrolyzed water (electrolysis raw water) flowing in the first electrolysis chamber 60. The whole amount of the electrolyzed water is supplied into the second electrolysis chamber 70 through the circulation pipe 19. The hydrogen gas generated by the electrolysis penetrates the electrode catalyst 43 and is supplied into the second electrolysis chamber 70. At this time, although the hydrogen gas is in the state of fine bubbles, the hydrogen gas is maintained in the state of fine bubbles by the presence of the power feeder 37. The hydrogen gas is dispersed and dissolved in the electrolyzed water flowing in the second electrolysis chamber 70. The electrolyzed water discharged from the second electrolysis chamber 70 flows through the pipe 21, passes through the activated carbon filter 23, and is supplied to the electrolyzed water receiving vessel 25.

The current applied to the electrolysis raw water is preferably 0.5 to 10 (A) and preferably 1.0 to 3.0 (A) in particular with respect to the electrolysis raw water having a flow rate of 0.1 (L) per minute. When the current is less than 0.5 (A), the amount of dissolved oxygen and the amount of dissolved hydrogen in the electrolyzed water cannot be made sufficiently larger than those in the electrolysis raw water. When the current exceeds 10 (A), since a large current flows, fatigue of the MEA increases, and an electrolysis efficiency tends to be extremely lowered. In addition, the electrolysis electric quantity per 100 (mL) of the electrolysis raw water is preferably 30 to 600 coulombs, and more preferably 60 to 180 coulombs.

The flow rate of the electrolysis raw water supplied to the electrolysis tank 50 is preferably 0.1 to 10 (L/min), and preferably 0.2 to 1 (L/min) in particular.

The supply of the electrolysis raw water in the present apparatus 100 can be performed by connecting to a tap instead of the electrolysis raw water storage vessel. In this case, since the transfer of the tap water and the electrolyzed water obtained by electrolyzing the tap water in the present apparatus can be performed by a pressure of the tap water, the pump 15 can be omitted.

The electric conductivity of the electrolysis raw water is preferably 0.5 to 100 (mS/m), and more preferably 0.5 to 20 (mS/m). In addition, since the present apparatus can perform electrolysis efficiently even if no electrolyte is added, tap water is preferable. When an electrolyte is added, it is preferable to use the electrolyte containing no chloride ion.

EXAMPLES

Hereinafter, the present invention will be described more specifically with reference to Examples and Comparative examples.

Example 1

The apparatus illustrated in FIGS. 1 and 2 was configured. A fluorine-based polymer membrane having a sulfonate group with the thickness of 182 (μm) was used as the solid polymer electrolyte membrane, iridium with the thickness of 12.5 (μm) was used as the electrode catalyst on the anode side, and platinum with the thickness of 12.5 (μm) was used on the cathode side.

The electrolysis raw water (tap water) having the electric conductivity of 15.0 (mS/m) at a water temperature of 24 (° C.) was placed in the electrolysis raw water storage vessel

13 of 1200 (ml), pumped into the electrolysis tank 50 using the pump 15, and the electrolysis was started at the current of 2 (A) and a voltage of 2.4 (V). The flow rate of the electrolysis raw water was 230 (mL) per minute. Physicochemical parameters immediately after the generation of the obtained electrolyzed water were measured. Measured items were pH, oxidation-reduction potential ORP (mv), dissolved oxygen OD (ppm), dissolved hydrogen DH (ppm), electrical conductivity EC (mS/m), free chlorine concentration FC (ppm), and dissociation index pKw. The results are described in Table 1.

Example 2

The electrolyzed water was obtained in the same manner as in Example 1 except that the water having the electrical conductivity of 0.51 (mS/m) at the water temperature of 24 (° C.) obtained by treating tap water using a reverse osmosis membrane (RO membrane) apparatus was used as the electrolysis raw water, and an electrolysis conditions were changed to the current of 2 (A) and the voltage of 2.8 (V).

Example 3

The electrolyzed water was obtained in the same manner as in Example 1 except that the electrolysis raw water was changed to French mineral water (Vittel®) having the electric conductivity of 92.9 (mS/m) and the electrolysis conditions were changed to the current of 2 (A) and the voltage of 1.9 (V).

Comparative Example 1

The electrolyzed water was obtained in the same manner as in Example 1 except that the activated carbon filter 23 was omitted from the apparatus of Example 1.

Reference Example 1

The electrolyzed water was obtained in the same manner as in Example 1. In addition, comparison was also made on a case where the power feeders 35 and 37 were omitted from the apparatus of Example 1.

REFERENCE SIGNS LIST

100 electrolyzed water production apparatus
11 housing
13 electrolysis raw water storage vessel
15 pump
17, 21 pipe
19 circulation pipe
23 activated carbon filter
25 electrolyzed water receiving vessel
27 control unit
29 lid
31, 33 bipolar plate
35, 37 power feeder
40 membrane-electrode assembly
41, 43 electrode catalyst
45 solid polymer electrolyte membrane
60 anode chamber
70 cathode chamber

The invention claimed is:

1. An electrolyzed water production apparatus comprising:
- an electrolysis raw water supplying means;
- an electrolysis tank connected to the electrolysis raw water supplying means; and
- an activated carbon filter connected to an outlet of the electrolysis tank,
- wherein
  - the electrolysis tank is formed in a hollow box-like shape and includes a pair of bipolar plates arranged parallel to each other in contact with inner walls of the electrolysis tank facing each other,
  - a membrane-electrode assembly is disposed between the bipolar plates parallel to the bipolar plates and includes a solid polymer electrolyte membrane and liquid-permeable electrode catalysts formed in contact with both surfaces of the solid polymer electrolyte membrane, wherein the membrane-electrode assembly partitions an inside of the electrolysis tank to form a first electrolysis chamber and a second electrolysis chamber between the bipolar plates and the membrane-electrode assembly, respectively, and

TABLE 1

| | | pH | ORP (mV) | DO (ppm) | DH (ppm) | EC (mS/m) | FC (ppm) | pKw | Remarks |
|---|---|---|---|---|---|---|---|---|---|
| Example 1 | Electrolysis raw water (before electrolysis) | 7.20 | 340 | 8.25 | 0 | 15.0 | 0.08 | 14.02 | |
| | Electrolyzed water (after electrolysis) | 7.23 | −325 | 10.8 | 0.357 | 15.5 | 0 | 13.42 | |
| Example 2 | Electrolysis raw water (before electrolysis) | 6.80 | 379 | 8.50 | 0 | 0.51 | 0 | 14.00 | |
| | Electrolyzed water (after electrolysis) | 7.00 | −322 | 11.4 | 0.335 | 0.51 | 0 | 13.46 | |
| Example 3 | Electrolysis raw water (before electrolysis) | 7.50 | 415 | 8.30 | 0 | 92.9 | 0 | 13.98 | |
| | Electrolyzed water (after electrolysis) | 7.60 | −317 | 10.2 | 0.333 | 93.0 | 0 | 13.53 | |
| Comparative Example 1 | Electrolysis raw water (before electrolysis) | 7.20 | 340 | 8.25 | 0 | 15.0 | 0.08 | 14.02 | |
| | Electrolyzed water (after electrolysis) | 7.29 | −303 | 12.5 | 0.325 | 15.8 | 0.08 | 13.47 | |
| Reference Example 1 | Electrolysis raw water (before electrolysis) | 7.20 | 340 | 8.25 | 0 | 15.0 | 0.08 | 14.02 | |
| | Electrolyzed water (after electrolysis) | 7.60 | −73 | 9.60 | 0.120 | 14.9 | 0 | 13.55 | Without porous power feeder |
| | Electrolyzed water (after electrolysis) | 7.23 | −325 | 10.8 | 0.357 | 15.5 | 0 | 13.42 | With porous power feeder |

an outlet of the first electrolysis chamber and an inlet of the second electrolysis chamber are connected to each other in an outside of the electrolysis tank in a liquid-tight manner, a liquid-permeable power feeder is arranged almost uniformly in each of the first electrolysis chamber and the second electrolysis chamber, wherein the liquid-permeable power feeder electrically connects each of the bipolar plates to each of the electrode catalysts in the membrane-electrode assembly, the power feeder includes a metallic mesh having a three-dimensional structure and having a wire diameter of 10 to 300 μm, a thickness of each of the electrode catalysts is 1 to 100 μm, and a distance between each of the bipolar plates and each of the electrode catalysts is 1.0 to 3.0 mm.

2. The electrolyzed water production apparatus of claim 1, wherein a material of the electrode catalysts is platinum or iridium alloy.

3. A method for producing electrolyzed water using the electrolyzed water production apparatus of claim 1, the method comprising:

feeding an electrolysis raw water to a first electrolysis chamber and a second electrolysis chamber of an electrolysis tank in sequence;

electrolyzing water in a membrane-electrode assembly by supplying a current from a bipolar plate disposed in the electrolysis tank to the membrane-electrode assembly through a power feeder;

obtaining the electrolyzed water by sequentially dissolving oxygen gas and hydrogen gas generated during electrolyzation in water flowing in the first electrolysis chamber and the second electrolysis chamber, respectively; and conducting the electrolyzed water discharged from the second electrolysis chamber through an activated carbon filter.

4. The method of claim 3, wherein an electric conductivity of the electrolysis raw water is 0.5 to 100 mS/m.

5. The method of claim 3, wherein an electrolysis electric quantity per 100 mL of the electrolysis raw water is 60 to 180 coulombs.

* * * * *